United States Patent

Mizunuma et al.

[15] 3,663,287
[45] May 16, 1972

[54] CEMENT ADDITIVE COMPRISING CALCIUM SULFO-ALUMINATE, AN ORGANIC ADHESIVE, A FOAMING AGENT, AND A DISPERSING AGENT

[72] Inventors: Tsutomu Mizunuma; Tsukuru Azumi, both of Ohmi-Machi, Nishikubiki-gun, Japan

[73] Assignee: Denki Kagaku Kogyo Kabushiki Kaisha, Tokyo, Japan

[22] Filed: Sept. 4, 1970

[21] Appl. No.: 69,945

[30] Foreign Application Priority Data

Nov. 4, 1969 Japan....................44/87627

[52] U.S. Cl....................106/315, 106/86, 106/87, 106/90, 106/92, 106/93, 106/104, 106/314
[51] Int. Cl................C04b 11/08, C04b 11/14, C04b 21/02
[58] Field of Search...............106/86, 87, 90, 92, 93, 104, 106/314, 315

[56] References Cited

UNITED STATES PATENTS

| | | | |
|---|---|---|---|
| 3,510,326 | 5/1970 | Miki | 106/104 |
| 3,414,420 | 12/1968 | Maravilla | 106/315 |
| 3,303,037 | 2/1967 | Klein | 106/104 |
| 3,090,692 | 5/1963 | Kelly et al. | 106/315 |
| 3,053,673 | 8/1962 | Walker | 106/90 |
| 3,027,266 | 3/1962 | Wikne | 106/90 |
| 2,857,287 | 10/1958 | Kampf | 106/315 |
| 2,927,033 | 3/1960 | Benedict et al. | 106/90 |
| 2,576,955 | 12/1951 | Ludwig | 106/90 |

*Primary Examiner*—James E. Poer
*Assistant Examiner*—W. T. Scott
*Attorney*—Sughrue, Rothwell, Mion, Zinn & Macpeak

[57] ABSTRACT

A cement additive consisting of 100 parts by weight of a mineral consisting mainly of calcium sulfo-aluminate, which forms ettringite having a high content of sulfate through hydration, 0.1 to 2.0 parts by weight of an organic adhesive, 0.005 to 0.5 part by weight of a blowing agent and 1.0 to 6.0 parts by weight of a dispersing agent is suitable for grout. This cement additive is preferred to be added with 0.5 to 10.0 parts by weight of an accelerating agent.

5 Claims, No Drawings

CEMENT ADDITIVE COMPRISING CALCIUM SULFO-ALUMINATE, AN ORGANIC ADHESIVE, A FOAMING AGENT, AND A DISPERSING AGENT

The present invention relates to a cement additive, more particularly a cement additive for grout.

The cement additive of the present invention consists essentially of a cement expanding agent composed of a mineral consisting mainly of calcium sulfoaluminate and contains proper amounts of an organic adhesive, a foaming agent, a dispersing agent and, if necessary an accelerating agent and satisfies all the properties required for the grout by the synergistic effects of these agents.

When a grouting is made in fixing anchor bolts for bridges and the like or installing a pedestal of a machine, it is desired to improve workability, early strength and bond shear strength without causing bleeding and settling. Heretofore, iron powder series grouting material has been used in order to solve these problems and this material has fairly improved the problem of settling as compared with ordinary cement but has been low in the bond shear strength and the effect of grout has never been fully developed.

The inventors have made various investigations to solve these problems and accomplished the present invention. The main component of the cement additive according to the present invention is calcium sulfo-aluminate, which forms ettringite ($3CaO \cdot Al_2O_3 \cdot 3CaSO_4 \cdot 32H_2O$) through a hydration and develops expanding property. In general cement has a defect that it shrinks in hardening and drying after the hydration but calcium sulfo-aluminate is most effective in order to improve the defect and accordingly, in the present invention calcium sulfoaluminate is the basic component in order to prevent the bleeding and settling and to prevent cracks owing to the drying and shrinkage.

The "calcium sulfoaluminate expanding agent" to be used herein means one capable of forming ettringite having a high content of sulfate through hydration.

The inventors have found that when proper amounts of an organic adhesive, a foaming agent, a dispersing agent, and if necessary an accelerating agent are added to calcium sulfoaluminate expanding agent, the resulting mixture is very particularly excellent as a cement additive for grout. Explanations will be made with respect to the above four additives to be blended in the present invention.

As organic adhesives, for example, mention may be made of polyvinyl alcohol, methyl cellulose, CMC, gelatine and starch, which upon the addition of water, absorb water to become semi-gelatinous in the cement phase, and increases the viscosity of the cement paste itself, whereby rising of free water in the paste, i.e., bleeding can be prevented. However, in order to completely prevent the bleeding only by adding the adhesive, a large amount of the organic adhesive is necessary and consequently the strength after hardening the past decreases. The inventors have succeeded in improving the function of the adhesive by compounding 0.1 to 2.0 parts based on calcium sulfoaluminate expanding agent, of the organic adhesive to the other additives. When the amount is less than 0.1 part, the effect does not appear, while when the amount is more than 2.0 parts, the strength of the grout decreases.

The foaming agents include, for example, metal powders, such as Al, Zn, CaSi, AlN and the like, which have a very high foam retaining ability. These agents form independent pores in cement paste and enhance the fluidity and filling property of paste due to the bearing effect of pores and prevent the surface settling after applied paste, mortar and concrete. In mortar and concrete, the foaming agent serves to prevent the settling of aggregates by the pores and are effective for preventing the bleeding and the surface settling. However, when the foaming agent is solely used in cement paste, the viscosity of the cement paste itself is insufficient and therefore the generated pores float easily and after the floating passage for water is formed in the paste and it is impossible to prevent the bleeding completely and further the surface settling of the casted concrete is more noticeable than usual owing to the escape of pores. However, the inventors have solved this problem by compounding the foaming agent together with the other additives. The mixing ratio of the foaming agent is 0.005 to 0.5 parts based on calcium sulfoaluminate expanding agent. When the ratio is less than 0.005 part, it is impossible to attain a satisfactory effect, while when the ratio is more than 0.5 part, the strength of the grout decreases. When the above described foaming agent and organic adhesive are added to calcium sulfoaluminate in the mixing ratio as described above, a considerably more excellent effect can be attained than the conventional grouting materials and, for example, the bond shear strength is improved about more than six times. Accordingly, calcium sulfoaluminate expanding agent added with the foaming agent and the organic adhesive can be used as such but the initial strength (compression) is not substantially improved and such cement additive has not been a satisfactory cement additive for grout.

The inventors have made further investigations and as the result accomplished an ideal cement additive for grout in which the initial strength is also improved by additionally adding a dispersing agent and an accelerating agent to the above described two additives.

In general, fine powders such as cement are composed of finely divided particles referred to as primary particles and flocculate mutually by "Van der Walls" force between particles to form secondary particles (agglomerates) having many spaces, in which a large number of primary particles contact with each other. When such secondary particles having a large appearance are dispersed in water, if the dispersion is left to stand, the particles sedimentate immediately and a favorable suspension cannot be obtained, even if the stirring is effected thoroughly. When such a cement agglomerate is added with a dispersing agent, such as sodium or potassium lignin sulfonate and the like, the dispersing agent permeates between the primary particles and is adsorbed on the surfaces of the primary particles and the surface of each particle is charged negatively by the negative charge of the dispersing agent and repel with each other and the secondary particles are separated into the primary particles to form an electrical double layer, and the precipitation hardly occurs, and an improved suspension can be formed. Consequently the workability (fluidity) of the paste, mortar, concrete, and the like is improved and the amount of water used decreases and therefore the strength is considerably improved. The mixing ratio of the dispersing agent is 1.0 to 6.0 part based on calcium sulfo-aluminate expanding agent and when the ratio is less than 1.0 part, the dispersing effect is not sufficient, while when the ratio exceeds 6.0 parts, the initial strength decreases.

It has been found that when working in a cold period or rapid working is required and an early strength is necessary, organic and inorganic halides as accelerating agents can develop the performances of the grouting material fully without deteriorating the functions of every additive component. The mixing ratio of the accelerating agent is 0.5 to 10.0 parts based on the calcium sulfoaluminate expanding agent. When the ratio is not within this range, the early strength is not fully developed. As the accelerating agents, use may be made of, for example, $ZnCl_2$, $AlCl_3$, $CaCl_2$, $MgCl_2$, $FeCl_2$, $FeCl_3$, $NiCl_2$, $CoCl_2$, $MgBr_2$, $ZnI_2$, $CaI_2$, $CHCl_3$, $CCl_4$, and the like.

As mentioned above, the present invention consists of a cement additive for grout, in which 0.1 to 2.0 part of the organic adhesive, 0.005 to 0.5 parts of the foaming agent and 1.0 to 6.0 percent by weight of the dispersing agent are compounded to calcium sulfoaluminate expanding agent and if necessary 0.5 to 10.0 parts of the accelerating agent are added thereto, each mixing part being based on the amount of calcium sulfoaluminate expanding agent. When such additive is mixed with cement in the mixing ratio of 5 to 15 parts of the additive to 95 to 85 parts of cement, paste, mortar and concrete in which substantially all properties required for the grout are satisfied, can be obtained. If less than 5 parts additive are used, a satisfactory effect cannot be obtained and in excess of 15 parts additive, the strength of the grout decreases.

Cements to be compounded with the cement additive for grout according to the present invention include normal Portland cement, early high-strength cement, moderate heat cement, Portland blast furnace slag cement, fly ash cement, silica cement and the like. The cement additive for grout is most suitable for filling, for example, of machine foundations, railway beds, lower portions of supports of bridges, joints of structures, foundations of steel towers for transmission lines, and the like.

The following examples are given in illustration of this invention and are not intended as limitations thereof. For purposes of the specification and claims, part and percentage means by weight.

EXAMPLE 1

Eleven percent of a mixture consisting of 96.1 parts of calcium sulfoaluminate expanding agent (trademark : CSA, made by DENKI KAGAKU K.K.), 0.9 part of polyvinyl alcohol, 0.009 part of powdery aluminum and 3 parts of calcium lignin sulfonate was mixed with 89 percent of normal Portland cement. The test for physical properties were made with respect to the resulting mixture as a grouting cement to obtain the results as shown in the following Table 2. For the comparison, the results of a conventional iron powder series additives are shown together in Table 2. The calcium sulfoaluminate expanding agent used herein has the following composition as shown in Table 1.

TABLE 1

| Ig. Los. | Insol. | SiO$_2$ | Al$_2$O$_3$ | Fe$_2$O$_3$ | CaO | MgO | TiO$_2$ | SO$_3$ |
|---|---|---|---|---|---|---|---|---|
| 0.5 | 2.3 | 1.6 | 12.3 | 0.7 | 48.7 | 0.4 | 0.3 | 32.2 |

TABLE 2

| Additive | Flow value, m./m. | Bleeding ratio, percent | Compression strength, first day, kg./cm.$^2$ | Setting ratio, percent | Bond shear strength, seventh day, kg./cm.$^2$ |
|---|---|---|---|---|---|
| Present invention | 250 | 0 | 261 | +0.23 | 28.5 |
| Conventional additive | 250 | 0.2 | 166 | −0.12 | 3.8 |

MEASURING PROCESS

1. Flow value : JIS. R–5201
2. Bleeding ratio : JIS. A–1123
3. Compression strength : JIS. R–5201
4. Settling ratio:

Mortar was filled in a cylinder made of stainless steel having a diameter of 5 cm and a height of 10 cm and the surface finishing was effected immediately. The upper end of the mortar in the vessel was regarded as zero and the settling of the mortar surface 24 hours after being filled with mortar was measured by a micrometer at 5 points and the average value was calculated.

5. Adhesion shear strength:

Mortar was filled in a steel ring (inner diameter: 15.6 cm, outer diameter: 16.5 cm, height: 4 cm) and after a given age, the outer periphery portion of the mortar was pressed downwards by means of a steel disc (diameter: 15 cm, height: 4.5 cm) and the mortar was extruded from the steel ring. Then the required load was P kg and the inner surface area of said ring was A cm$^2$ and the bond shear strength S was calculated from the following formula $$S = P/A.$$

EXAMPLE 2

The cement additive for grout prepared in Example 1 was storaged in a closed vessel for a long period and variations of properties in every age (month) were determined. As shown in Table 3, any variation has never been observed even after 6 months.

TABLE 3

| Age (month) | Bleeding ratio, percent | Compression strength, first day, kg./cm.$^2$ | Settling ratio, percent | Bond shear strength, seventh day, kg./cm.$^2$ |
|---|---|---|---|---|
| 0 | 0 | 251 | +0.23 | 28.5 |
| 1 | 0 | 267 | +0.26 | 29.0 |
| 2 | 0 | 265 | +0.24 | 28.7 |
| 4 | 0 | 270 | +0.27 | 28.1 |
| 6 | 0 | 258 | +0.25 | 29.1 |

EXAMPLE 3

Eleven percent of a mixture consisting of 95.1 parts of calcium sulfoaluminate expanding agent, 0.4 part of methyl cellulose, 0.007 part of calcium silicon powder, 3.5 parts of sodium lignin sulfonate and 1.0 part of magnesium chloride was mixed with 89 percent of normal Portland cement. The test for physical properties was made with respect to the resulting mixture and a comparative test was made with respect to conventional iron powder. The results are shown in the following Table 4.

TABLE 4

| Additive | Flow value, m./m. | Bleeding ratio, percent | Compression strength, first day, kg./cm.$^2$ | Settling ratio, percent | Bond shear strength, seventh day, kg./cm.$^2$ |
|---|---|---|---|---|---|
| Present invention | 200 | 0 | 333 | +0.32 | 31.5 |
| Conventional additive | 200 | 0 | 309 | −0.47 | 4.6 |

As mentioned in detail, when early strength cement additive according to the present invention is used, (1) there is no bleeding, (2) no settling, (3) the bond shear strength is noticeably increased, (4) the early strength is improved and (5) the workability is favorable as compared with the conventional additives.

What is claimed is:

1. A cement additive consisting essentially of 100 parts by weight of a mineral consisting essentially of calcium sulfoaluminate, which forms ettringite having a high content of sulfate through hydration, 0.1 to 2.0 parts by weight of an organic adhesive selected from the group consisting of polyvinyl alcohol, methyl cellulose, CMC, gelatin and starch, 0.005 to 0.5 part by weight of a foaming agent and 1.0 to 6.0 parts by weight of a dispersing agent.

2. The cement additive as claimed in claim 1, wherein said foaming agent is selected from the group consisting of Al, Zn, CaSi, and AlN.

3. The cement additive as claimed in claim 1, wherein said dispersing agent is selected from the group consisting of sodium lignin sulfonate and potassium lignin sulfonate.

4. The cement additive according to claim 1 wherein said additive contains an accelerating agent.

5. The cement additive as claimed in claim 4, wherein said accelerating agent is selected from the group consisting of ZnCl$_2$, AlCl$_3$, CaCl$_2$, MgCl$_2$, FeCl$_3$, FeCl$_2$, NiCl$_2$, CoCl$_2$, MgBr$_2$, ZnI$_2$, CaI$_2$, CHCl$_3$ and CCl$_4$.

* * * * *